United States Patent
Naess

(10) Patent No.: US 9,321,511 B2
(45) Date of Patent: Apr. 26, 2016

(54) FLOATING ELEMENT AND METHOD OF FORMING A BUOYANCY SYSTEM

(71) Applicant: Akvadesign AS, Bronnoysund (NO)

(72) Inventor: Anders Naess, Bronnoysund (NO)

(73) Assignee: Akvadesign AS, Bronnoysund (NO)

( * ) Notice: Subject to any disclaimer, the term of this patent is extended or adjusted under 35 U.S.C. 154(b) by 0 days.

(21) Appl. No.: 14/360,220

(22) PCT Filed: Nov. 29, 2012

(86) PCT No.: PCT/NO2012/050239
§ 371 (c)(1),
(2) Date: May 22, 2014

(87) PCT Pub. No.: WO2013/085392
PCT Pub. Date: Jun. 13, 2013

(65) Prior Publication Data
US 2015/0090173 A1 Apr. 2, 2015

(30) Foreign Application Priority Data
Dec. 9, 2011 (NO) .................................. 20111704

(51) Int. Cl.
*B63B 35/44* (2006.01)
*A01K 61/00* (2006.01)
*B63B 35/34* (2006.01)
*E01D 15/14* (2006.01)
*E02B 3/06* (2006.01)
(Continued)

(52) U.S. Cl.
CPC ............... *B63B 35/44* (2013.01); *A01K 61/007* (2013.01); *B63B 3/08* (2013.01); *B63B 35/34* (2013.01); *B63C 1/02* (2013.01); *E01D 15/14* (2013.01); *E02B 3/064* (2013.01); *Y10T 29/49826* (2015.01)

(58) Field of Classification Search
CPC ........ B63B 35/34; B63B 35/38; B63B 35/36; B63B 35/44
USPC .......................................... 114/263
See application file for complete search history.

(56) References Cited

U.S. PATENT DOCUMENTS 3,179,076 A * 4/1965 Sheffield ........................ 114/267
4,798,168 A   1/1989 Vadseth et al.
(Continued)

FOREIGN PATENT DOCUMENTS

GB   2068847   8/1981
GB   2125261   3/1984
(Continued)

OTHER PUBLICATIONS

International Search Report and Written Opinion for PCT/NO2012/050239 dated Mar. 4, 2013.

*Primary Examiner* — Stephen Avila
(74) *Attorney, Agent, or Firm* — Andrus Intellectual Property Law, LLP

(57) ABSTRACT

A floating element is for forming a modularly constructed buoyancy system. The floating element is provided with a cavity. At least the first side face of the floating element is provided with at least one first cut-out which, at its first end, is connected to a first channel whose mouth is in a first coupling face, and which, at its second end, is connected to a second channel whose mouth is in a second coupling face. A buoyancy system is made up of a plurality of floating elements. A method is for forming such a buoyancy system.

11 Claims, 10 Drawing Sheets

(51) Int. Cl.
*B63C 1/02* (2006.01)
*B63B 3/08* (2006.01)

(56) References Cited

U.S. PATENT DOCUMENTS

| | | | | |
|---|---|---|---|---|
| 5,732,649 | A | * | 3/1998 | Falcone ........................ 114/263 |
| 6,138,600 | A | * | 10/2000 | Berquist ....................... 114/267 |
| 2010/0282155 | A1 | | 11/2010 | Mattson |

FOREIGN PATENT DOCUMENTS

| | | |
|---|---|---|
| NO | 167543 | 8/1991 |
| NO | 169278 | 2/1992 |
| NO | 175341 | 6/1994 |
| WO | 9832330 | 7/1998 |
| WO | 2008104035 | 9/2008 |
| WO | 2008134842 | 11/2008 |
| WO | 2010098675 | 9/2010 |
| WO | 2011099827 | 8/2011 |

* cited by examiner

FLOATING ELEMENT AND METHOD OF FORMING A BUOYANCY SYSTEM

CROSS-REFERENCE TO RELATED APPLICATIONS

This application is the U.S. national stage application of International Application PCT/NO2012/050239, filed Nov. 29, 2012, which international application was published on Jun. 13, 2013, as International Publication WO2013/085392 in the English language. The international application is incorporated herein by reference, in entirety. The international application claims priority to Norwegian Patent Application No. 20111704, which is incorporated herein by reference.

FIELD

The invention relates to a floating element. More particularly, the invention relates to a floating element which is arranged to be connected to several like floating elements to form a modular buoyancy system. The buoyancy system may be used in aquaculture, in small-craft harbours and for other purposes a floating platform is needed.

BACKGROUND

Aquaculture is a fast-growing global industry. The conventional fisheries are declining dramatically and the seafood needed in the future will, to a greater extent, have to be produced by aquaculture.

However, in recent years, more challenges have arisen for this industry to be faced with. For the farming of salmonoids, this relates to, inter alia, the treatment of fish infected with crustaceous parasites like salmon louse, the escape of fish from floating farming cages, diseases due to viruses, bacteria and parasites, so-called "genetic contamination" of wild populations of salmonoids, and emissions of waste products from the cages into recipients. These challenges especially relate to the farming of fish in conventional floating cages allowing flow-through. Such open cages are constituted by a net which forms a closed enclosure for fish in particular, and which is kept afloat by means of a surrounding buoyancy system.

Previously, a device for farming aquatic organisms in a closed cage constituted by a tight, polymer material has been described, as in the patent document NO 175341, for example. The cage is provided with floating bodies. The patent document U.S. Pat. No. 4,798,168 discloses an alternative closed cage. The closed cage is provided with floating bodies and with a fence to prevent fish from jumping out of the cage. The patent document WO 2008/134842 discloses an open cage provided with a sectioned buoyancy system, in which the sections may include a submerged, symmetrical V-shaped portion. The patent document NO 167543 discloses a cage system with an inner cage and an outer cage which are kept afloat by a tubular, circular and sectioned buoyancy system. The patent document GB 21252.61 discloses a circular and sectioned buoyancy system, in which the sections are filled with polystyrene and foamed polyurethane.

Closed farming cages are known within the art. These are formed of a tight cloth material which forms a closed enclosure for aquatic organisms such as fish. To ensure that the water exchange rate is sufficient for maintaining a minimum oxygen level in the water within the cage, it is common to pump in so much water that the water surface inside the cage is higher than the water surface outside the cage. Thereby the pressure within the cage is larger than the ambient pressure and water will flow out of the cage through formed openings. This will subject the buoyancy system of a closed cage to larger forces than the buoyancy system of an open cage of the same size. In addition to keeping the actual cloth or net of the cage afloat, the buoyancy of the buoyancy system must be dimensioned for holding the amount of water within the cage that is above the water surface of the surrounding water. This water constitutes a considerable mass. In addition, this water has a moment of inertia which causes the wave influence on the buoyancy system to be greater than in an open cage where the wave motion passes substantially unobstructedly by the buoyancy system and into the cage.

The nets of open cages are attached to the buoyancy system by the buoyancy system being provided with projecting hooks. The buoyancy system may be provided with a handrail, and the projecting hooks may be fixed to the handrail. From so-called steel cages it is known to use special poles or supports provided with such hooks. The hooks may also be fixed to floating collars forming a buoyancy system.

Buoyancy systems for floating farming cages may be divided into two main groups, so-called steel cages and so-called plastic cages. Steel cages are made up of rectangular walkways of steel which are provided with floating bodies. The floating bodies may have the form of a rectangular box. The walkways are hinged together. The steel cages form a grid with longitudinal and transverse walkways. Each side of a square may be 10 m or 12 m long, for example. The seines, forming a closed enclosure, are placed in the grid and attached to the steel cage on hooks projecting from special poles or supports. Steel cages are also provided with railings, and the net may be attached to a handrail with hooks or lashings. The upper edge of the seine is thereby raised above the water surface and also forms a jump fence to prevent fish from escaping from the cage by jumping over the edge. The walkways of steel are formed with fixed lengths and cannot easily be adjusted in length. A plastic cage is constituted by at least one plastic tube which is welded together into a ring. Usually, the plastic cage is constituted by two concentric rings. Plastic cages with three concentric plastic rings are known as well. The plastic rings are connected to radially oriented damps of plastic or steel. Walkways may be placed on top of two concentric rings. The seine, which forms a closed enclosure, is placed within the innermost tube of the buoyancy system and is attached with projecting seine hooks. The seine hooks may be attached to the tube or to a railing projecting up from the buoyancy system. The circumference of the seine in a plastic cage may be, for example, between 90 m and 160 m, corresponding to a diameter of between approximately 30 m and 50 m. The plastic rings are formed with fixed lengths and cannot easily be adjusted in length.

SUMMARY

The invention has for its object to remedy or reduce at least one of the drawbacks of the prior art or at least provide a useful alternative to the prior art.

The object is achieved through features which are specified in the description below and in the claims that follow.

In a first aspect, the invention relates to a floating element for forming a modularly constructed buoyancy system, the floating element being provided with a cavity, and at least the first side face of the floating element being provided with at least one first cut-out which, at its first end, is connected to a first channel whose mouth is in a first coupling face, and which, at its second end, is connected to a second channel whose mouth is in a second coupling face.

The opposite, second side face of the floating element may be provided with at least one second cut-out which, at its first end, is provided with a first channel whose mouth is in the first coupling face, and which, at its second end, is provided with a second channel whose mouth is in the second coupling face. In an alternative embodiment, the first side face may further be provided with a third cut-out which, at its first end, is provided with a first channel whose mouth is in the first coupling face, and which, at its second end, is provided with a second channel whose mouth is in the second coupling face. In an alternative embodiment, the second side face may further be provided with a fourth cut-out which, at its first end, is provided with a first channel whose mouth is in the first coupling face, and which, at its second end, is provided with a second channel whose mouth is in the second coupling face. The channel may form a recess in the coupling face.

There may be a transverse channel extending from the first cut-out to the second cut-out. In the position of application, the first side face may have a portion submerged deeper than the second side face. The floating element as described may be provided with two keel portions side by side. In its top face, the floating element may be provided with a plurality of grooves extending substantially from the first side face to the second side face. In the position of application, the grooves may form a downward slope from the first side face to the second side face. The cavity of the floating element may be filled with a buoyancy material.

The invention also relates to a buoyancy system which may include a plurality of floating elements as described in the above, and the buoyancy system may further be provided with at least one elongated connecting element which may extend from one floating element to an adjacent floating element and which may be housed in the recess of the floating element. The buoyancy system may further include at least one float which may abut against recesses in the coupling faces of two adjacent floating elements, and where the float may house the elongated connecting element.

The invention may also relate to a floating structure which may include a buoyancy system as described above. The invention may also relate to a farming cage which may be provided with a buoyancy system as described above. The invention may also relate to a small-craft harbour which may be provided with a buoyancy system as described above.

In a second aspect, the invention relates to a method of forming a buoyancy system, the method including the steps of:
a) providing a plurality of floating elements as described above;
b) providing at least one elongated connecting element;
c) threading the elongated connecting element through a recess in one coupling face of the floating element, through a first channel which connects a cut-out with the recess, through a second channel which connects the cut-out with a recess in the opposite coupling face of the floating element and out through the recess; and
d) repeating the step c).

The method may further, after the step c), include the steps of:
c') providing a float;
c'') threading the elongated connecting element through the float; and
d) repeating the steps from c).

The method may further include threading a further elongated connecting element according to the steps c) and d) through vacant recesses and cut-outs.

A floating element for forming a modularly constructed buoyancy system is also described, the floating element being provided with a cavity, and a first side face of the floating element having, in its position of application, a portion submerged deeper than a second side face. The floating element may further be provided with a second keel portion side by side with a first keel portion. In its first side face, the floating element may be provided with at least one cut-out as described above. In its second side face, the floating element may be provided with at least one cut-out as described above.

In a third aspect, the invention relates to the use of a float as a spacer between two adjacent floating elements, an elongated connecting element having been threaded through a bore in the float. The float, also called a seine float, may be constituted by a polymer material such as a plastic material.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 9A:
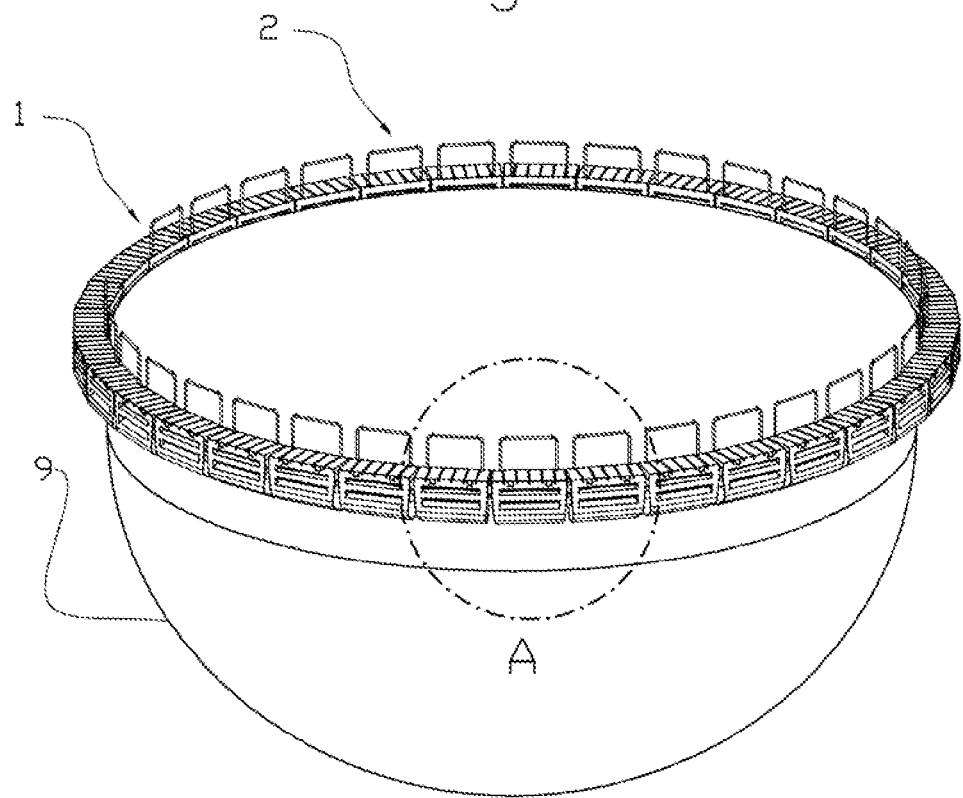
FIGS. 9A and 9B show, on a different scale, a perspective view of several floating elements put together into a buoyancy system and a cage, drawn schematically, attached to the buoyancy system, and an enlarged detail of the buoyancy system.
Figure 9B:
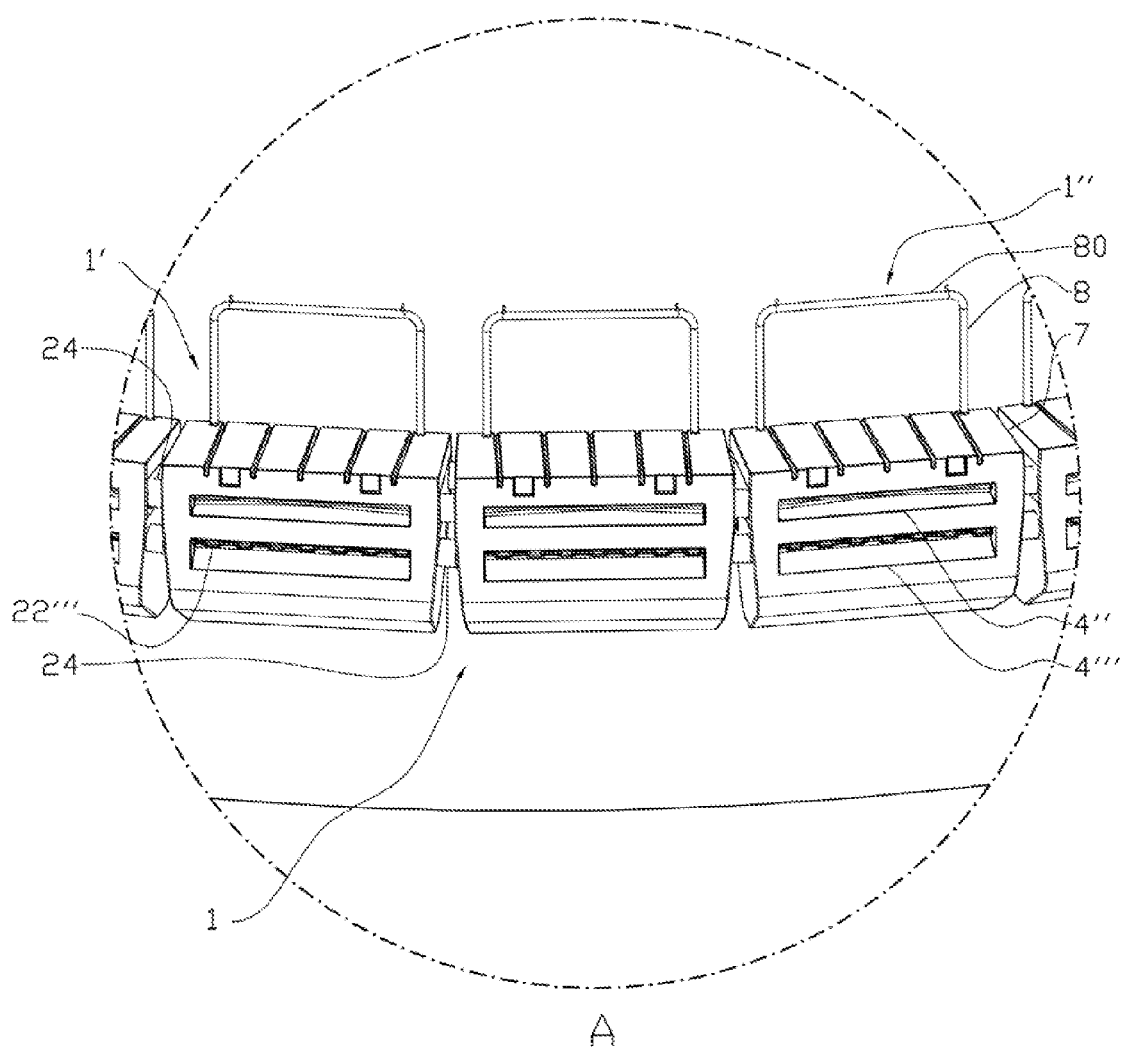

In the drawings, the reference numeral 1 indicates a floating element which may be built together in a modular fashion into a buoyancy system 2 as shown in FIGS. 9A and 9B. The floating element 1 is formed with an internal cavity 3. At least in a first side face 12, the floating element 1 is provided with at least one first cut-out 4 which, in some exemplary embodiments shown, extends substantially from a first coupling face 16 to an opposite second coupling face 18. At its first end 41, the first cut-out 4 is provided with a first channel 44 which has its mouth in the first coupling face 16. At its second end 43, the first cut-out 4 is provided with a second channel 45 which has its mouth in the second coupling face 18. The channels 44, 45 are formed with recesses 5 in the coupling faces 16 and 18, respectively, see FIG. 3 in particular.

Figure 1:
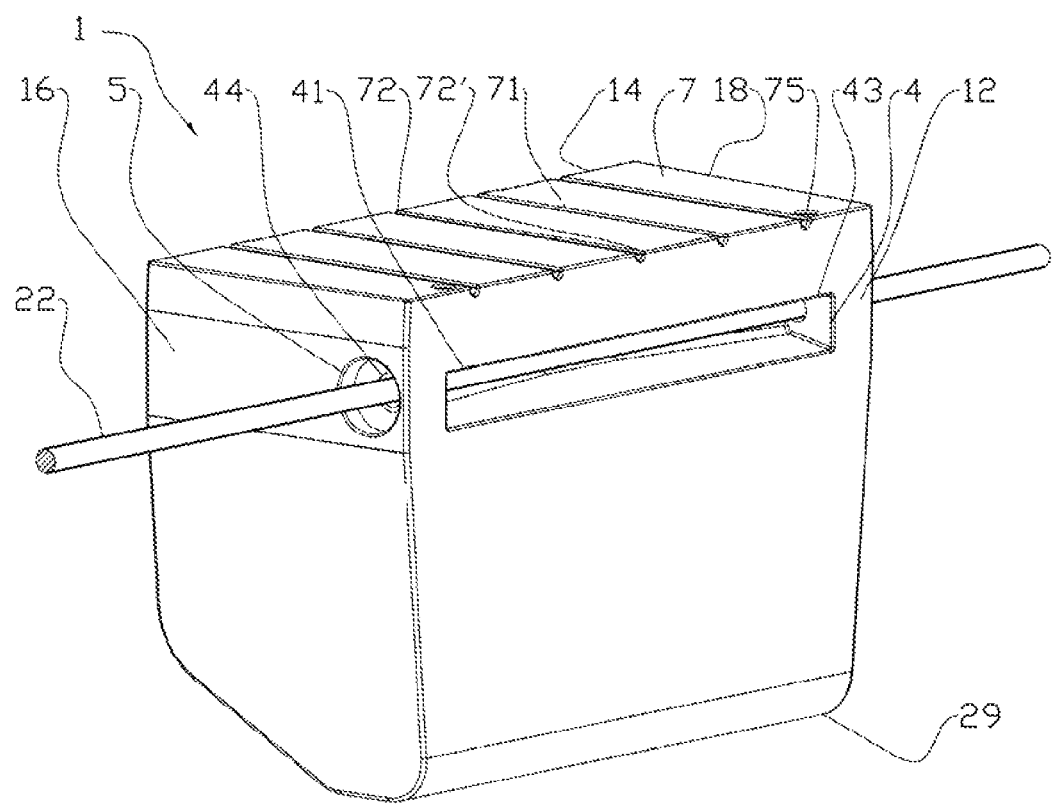
FIG. 1 shows a perspective view of a floating element in a first embodiment and with an elongated connecting element.
Figure 2A:
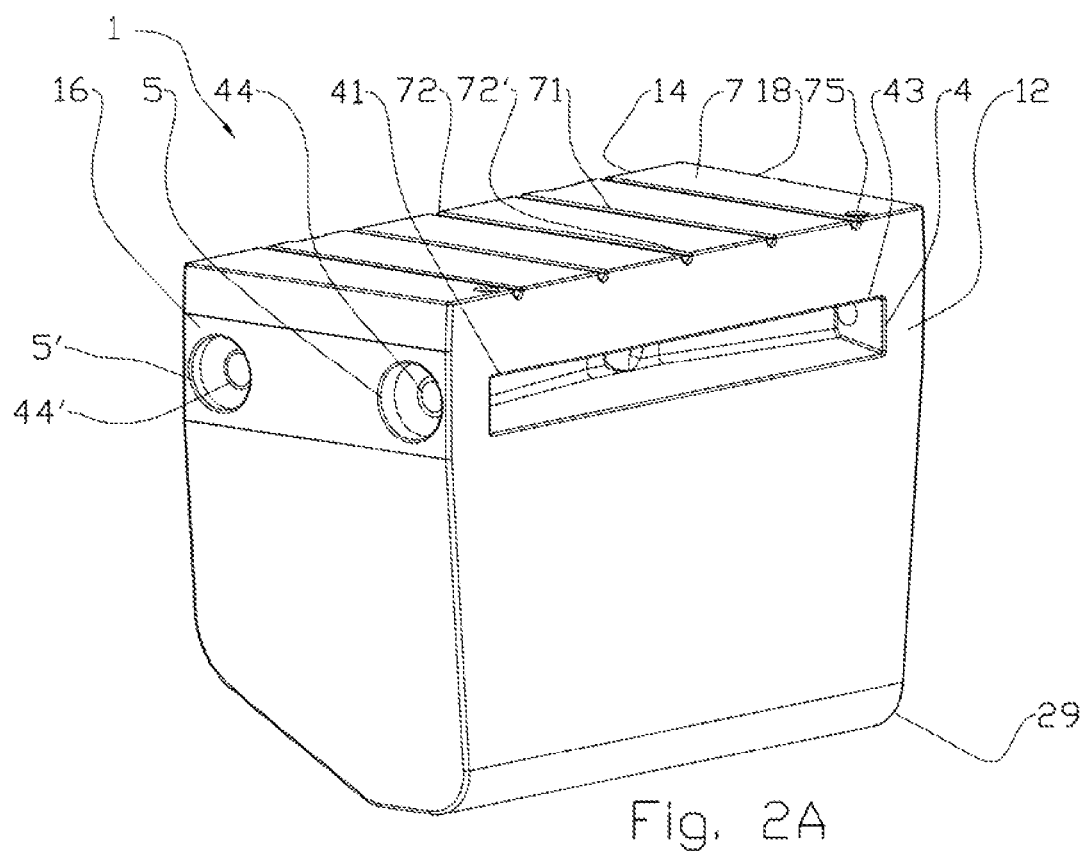
FIGS. 2A-C show, on the same scale as FIG. 1, a perspective view (A), a side view (B) and an end view (C) of a floating element in a second embodiment.
Figure 2B:
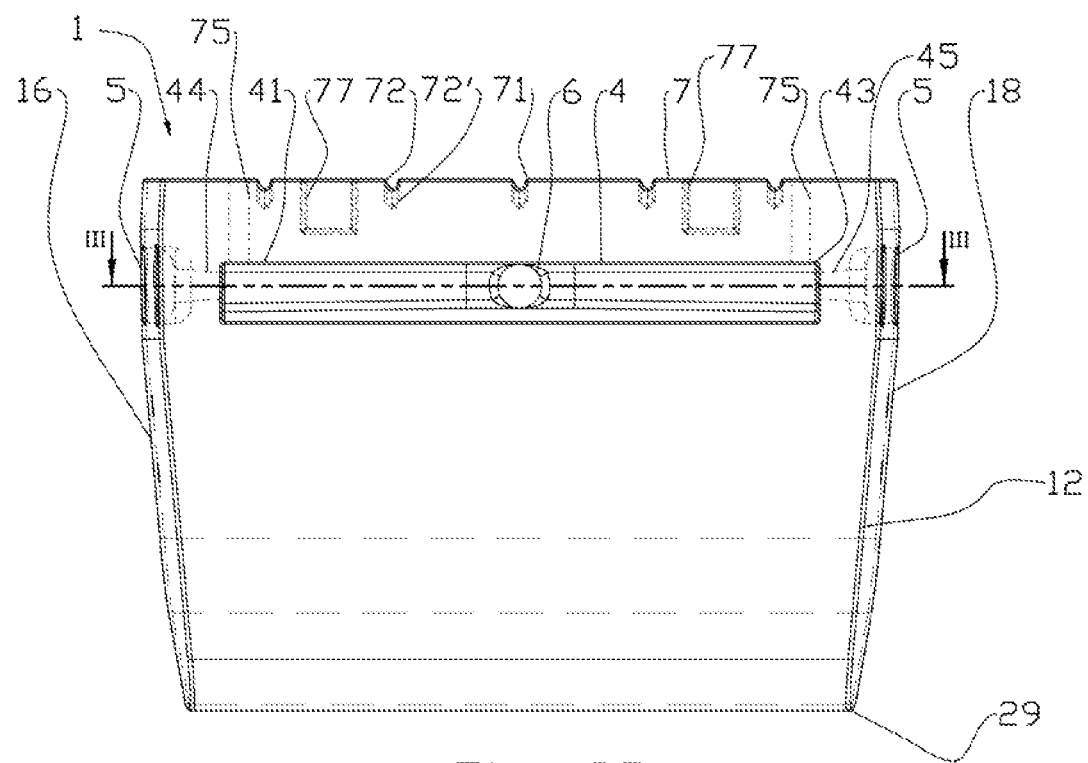
Figure 2C:
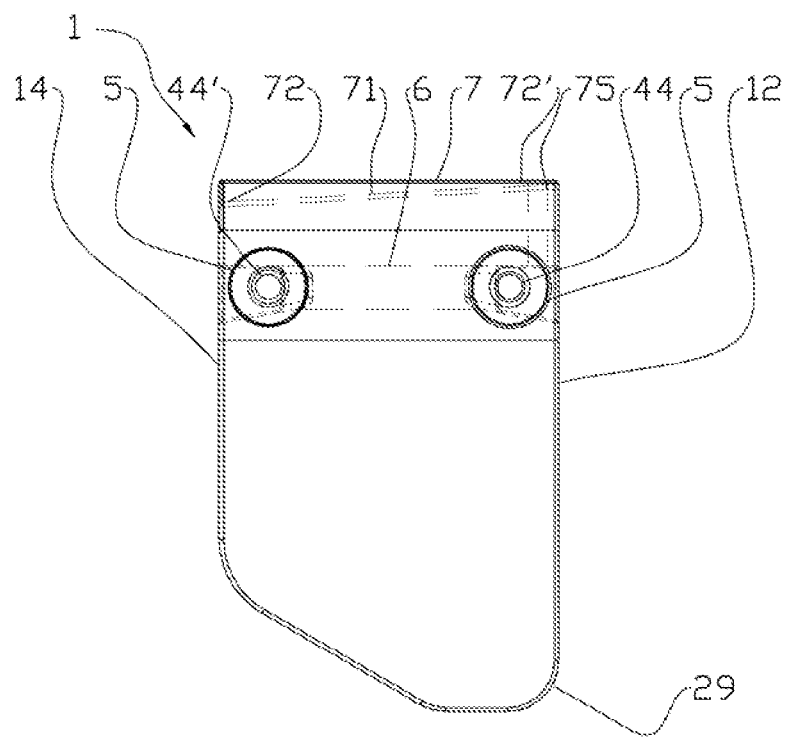
Figure 3:
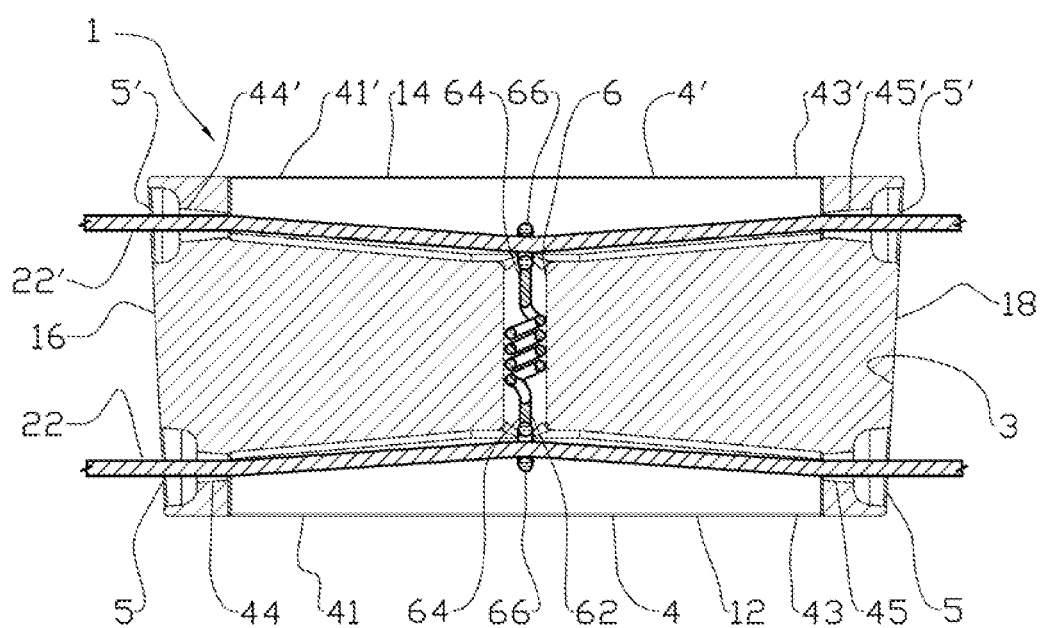
FIG. 3 shows, on the same scale as FIG. 2, a section through the floating element shown in FIG. 2 and with two elongated connecting elements seen from above.

The floating element 1 is shown in an alternative embodiment in FIGS. 2 and 3. The floating element 1 is provided with a second cut-out 4' in a second, opposite side face 14. The second cut-out 4' extends substantially from the first coupling face 16 to the opposite second coupling face 18. At its first end 41', the second cut-out 4' is provided with a first channel 44' which has its mouth in the first coupling face 16. At its second end 43', the second cut-out 4' is provided with a second channel 45' which has its mouth in the second coupling face 18, The channels 44', 45' are formed with recesses 5' in the coupling faces 16 and 18, respectively, The floating element 1 is further provided with a transverse channel 6 extending from the first cut-out 4 to the second cut-out 4', The floating element 1 is shown in a further alternative embodiment in FIG. 4. The floating element 1 is provided with a third cut-out 4" in the first side face 12. The third cut-out 4" extends substantially from the first coupling face 16 to the opposite second coupling face 18, At its first end 41", the third cut-out 4" is provided with a first channel 44" which has its mouth in the first coupling face 16. At its second end 43", the third cut-out 4" is provided with a second channel 45" which has its mouth in the second coupling face 18. The channels 44", 45" are formed with recesses 5" in the coupling faces 16 and 18, respectively.

Figure 5:
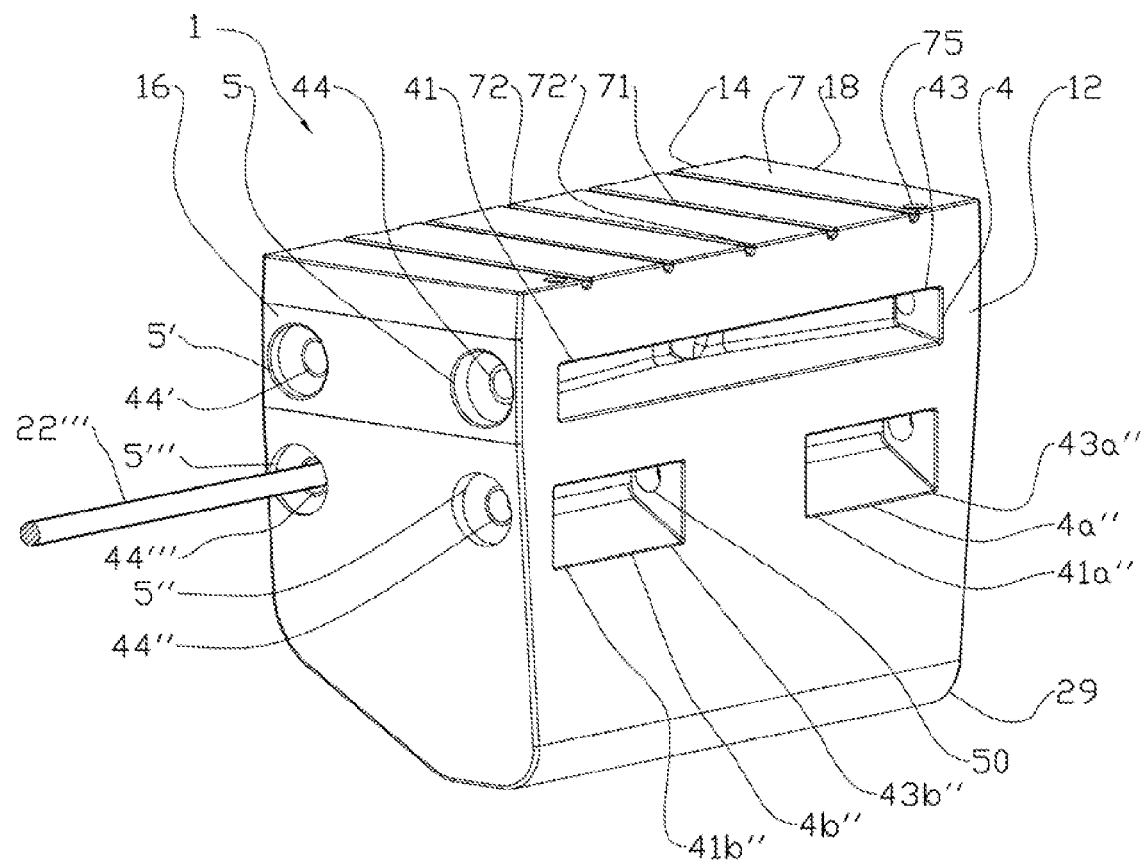
FIG. 5 shows, on the same scale as FIG. 1, a perspective view of a floating element in a fourth embodiment and with an elongated connecting element.
Figure 6:
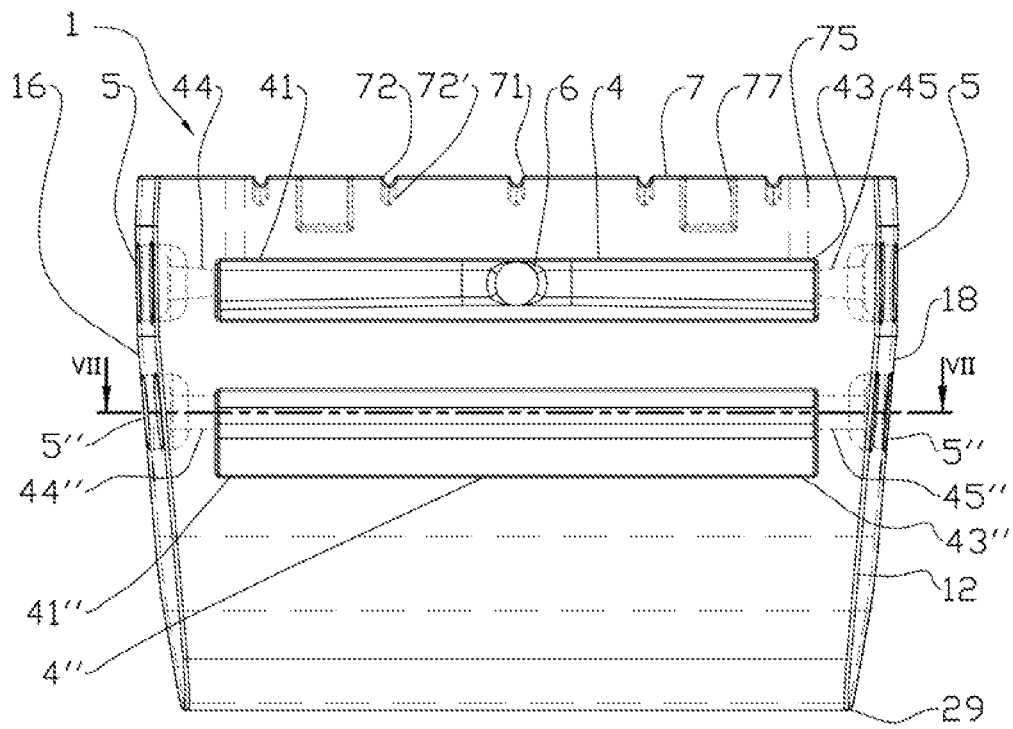
FIG. 6 shows, on the same scale as FIG. 1, a side view of a floating element in a fifth embodiment.
Figure 7:
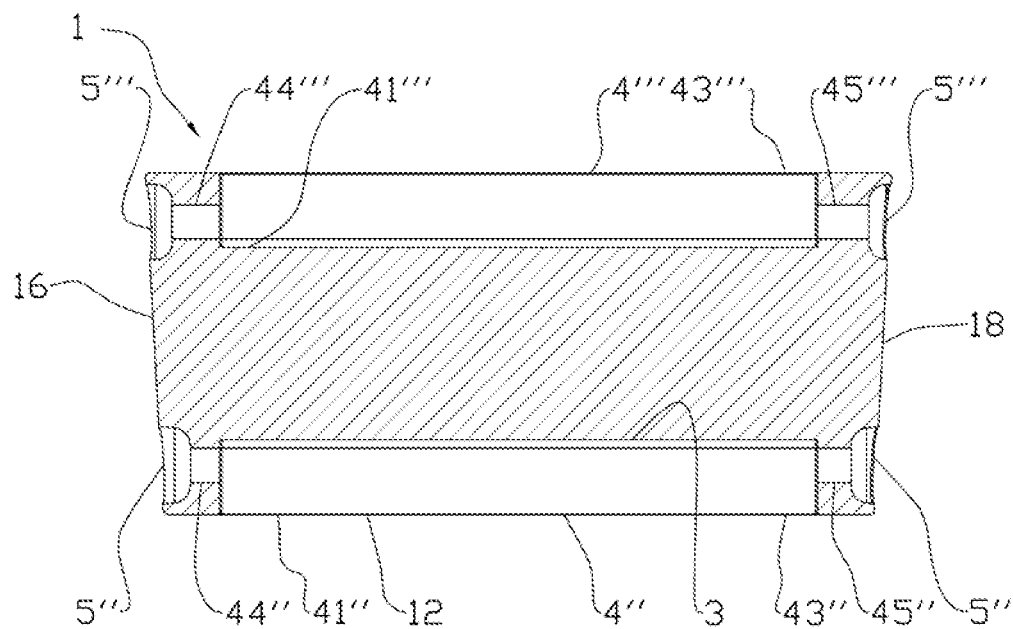
FIG. 7 shows, on the same scale as FIG. 6, a section through the floating element shown in FIG. 6.

The floating element 1 is shown in a further alternative embodiment, in the FIGS. 5-7. The floating element 1 is provided with a fourth cut-out 4''' in the second side face 14. The fourth cut-out 4''' extends substantially from the first coupling face 16 to the opposite second coupling face 18. At its first end 41''', the fourth cut-out 4''' is provided with a first channel 44''' which has its mouth in the first coupling face 16. At its second end 43''', the fourth cut-out 4''' is provided with a second channel 45''' which has its mouth in the second coupling face 18. The channels 44''', 45''' are formed with recesses 5''' in the coupling faces 16 and 18, respectively. In FIG. 5, an alternative embodiment of the connection between the channel 44" and the channel 45" is shown as well, The connection is constituted by two cut-outs 4a" and 4b" connected by a channel 50. The person skilled in the art will understand that one or more of the cut-outs 4, 4', 4", 4''' may be formed in this alternative embodiment. The person skilled in the art will further understand that the connection between the channel 44" and the channel 45" may be constituted by three cut-outs or more (not shown).

Figure 10:
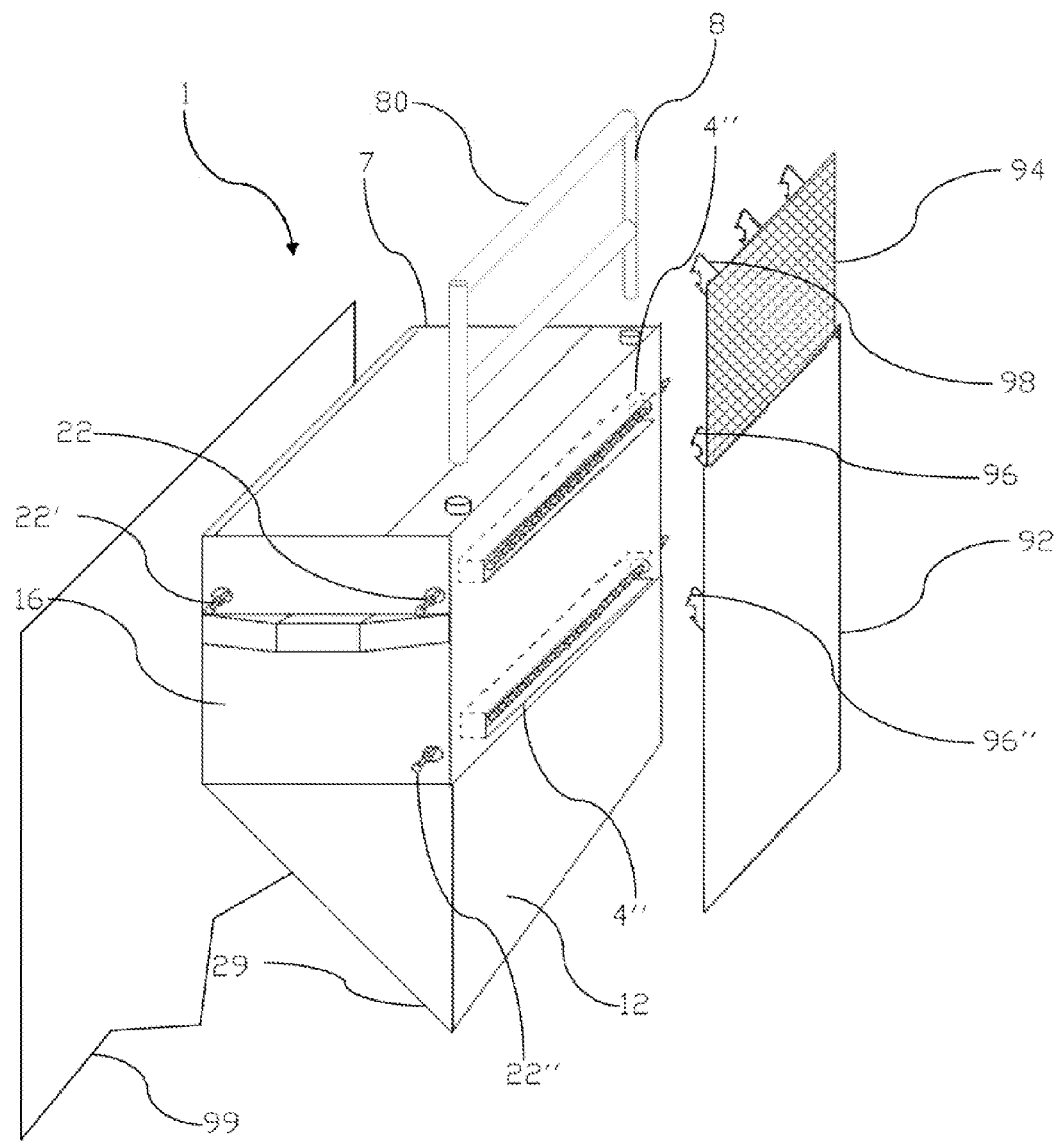
FIG. 10 shows a perspective view of an alternative floating element securing a cage and an escape net.

In a top face 7, the floating element 1 is provided with a plurality of grooves 71 extending from the first side face 12 to the second side face 14. One end portion 72 of the groove 71 is deeper than the opposite end portion 72' so that the groove 71 forms a downward slope towards one of the side faces 12, 14. The top face 7 is further provided with a cut-out 75. The cut-out 75 is arranged to house a pole 8 for a railing 80 as shown in FIGS. 9 and 10. The side face 14 is provided with a cut-out 77 arranged to house a reflector, such as a reflector for light.

Figure 8A:
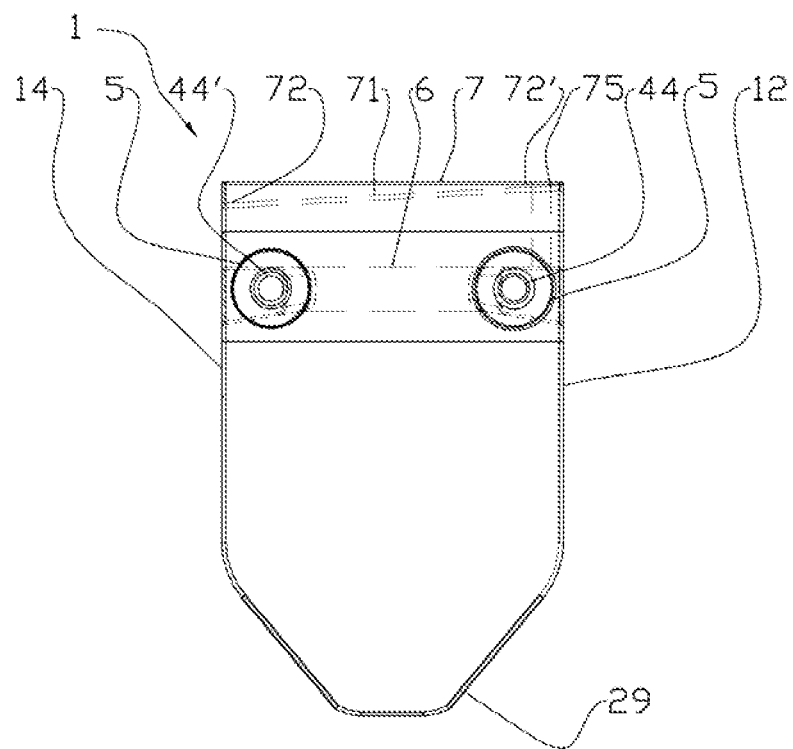
FIGS. 8A-C show, on the same scale as FIG. 1, end views of the floating element in alternative embodiments.
Figure 8B:
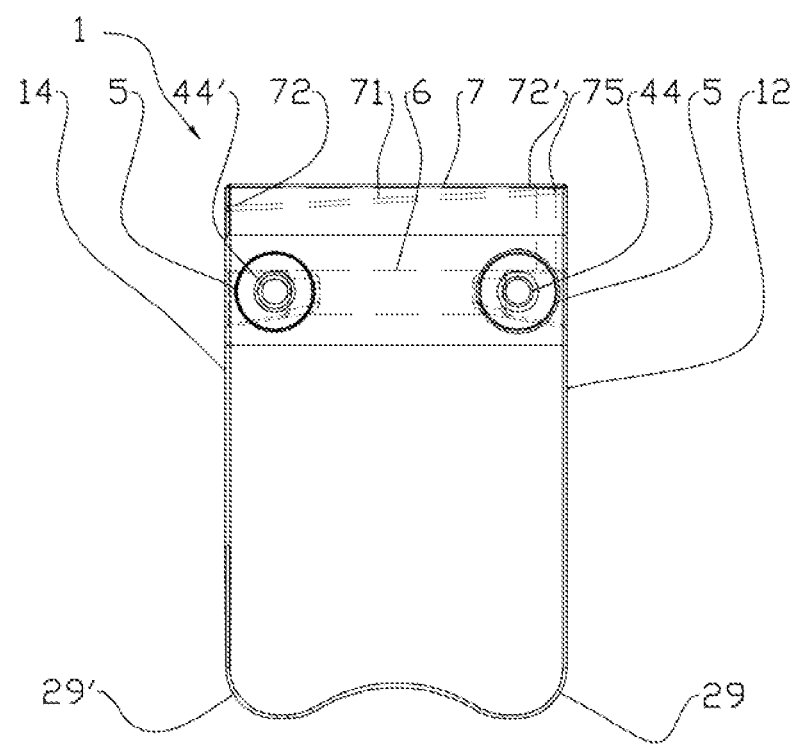
Figure 8C:
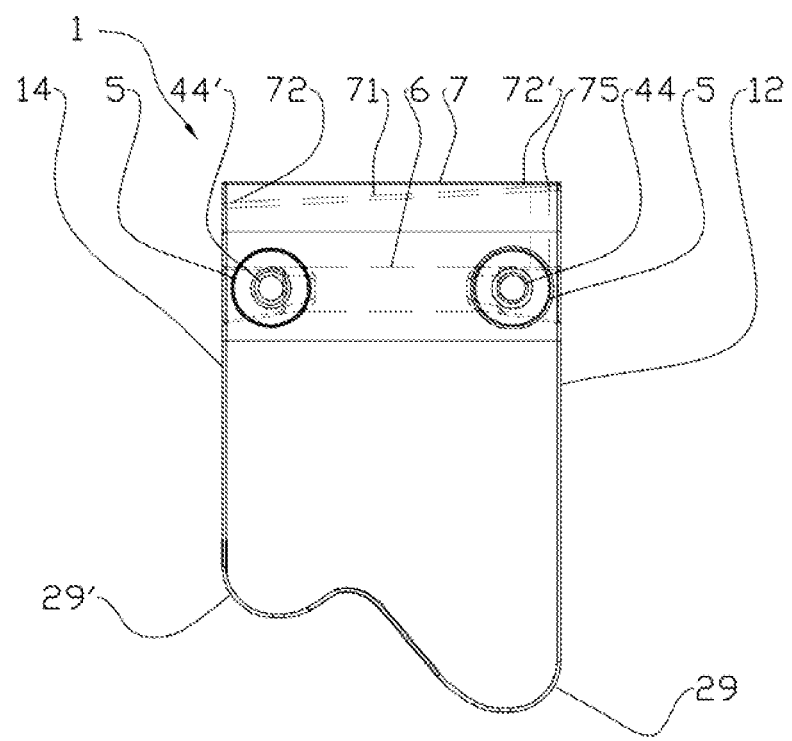

The FIGS. 1 to 7 show the floating element 1 in embodiments in which the keel portion 29 of the floating element 1 is positioned closer to the side face 12 than to the side face 14, In an alternative embodiment, the keel portion 29 is positioned substantially midway between the side faces 12 and 14 as shown in FIG. 8A. In a further alternative embodiment, the floating element 1 is provided with two keel portions 29, 29' as shown in FIGS. 8B and 8C. In the embodiment shown in 8B, the keel portion 29 exhibits substantially the same deepdraught as the keel portion 29'. In the embodiment shown, as shown in FIG. 8C, the keel portion 29 exhibits a different deepdraught from that of the keel portion 29'.

The side faces 12 and 14 are of different lengths so that the coupling faces 16, 18 are not parallel but are forming an angle in the position of application in the horizontal plane, see the FIGS, 3 and 7. When several floating elements 1 are put together, with the coupling face 16 of a first floating element 1 facing the coupling face 18 of a second, adjacent floating element 1', a curved buoyancy system 2 as shown in FIGS. 9A and 9B will he formed. When several floating elements 1 are put together, with the coupling face 16 of a first floating element 1 facing, the coupling face 18 of a second, adjacent floating element 1', and the coupling thee 18 of the first floating element 1 facing the coupling face 18 of a third, adjacent floating element 1", a straight buoyancy system 2 (not shown) will be formed. The distance between the two coupling faces 16, 18 is longer at the top thee 7 than at the keel portion 29.

The floating element 1 is connected in a buoyancy system 2 by a first elongated connecting element 22 selected from a group comprising chains, ropes, wires and rubber bands being threaded in through the recess 5 and the first channel 44 and out through the second channel 45. Then the connecting element 22 is threaded through a float 24 of a type known per se, as shown in FIGS. 9A and 9B. The next floating element 1' is added to the buoyancy system by the method being, repeated. In this way, the float 24 is positioned between two adjacent floating elements 1, 1' and abuts against and in the recess 5. The float 24 spaces two adjacent floating elements 1, 1' apart so that two coupling faces 16, 18 facing each other will not rub against each other, see FIGS. 9A and 9B. The decreasing distance between the coupling faces 16, 18, from the top face 7 towards the keel portion 29, also makes the coupling faces 16, 18 not rub against each other when two adjacent elements 1, 1' are scissoring relative to each other because of wave motion, see FIGS. 9A and 9B.

To further strengthen the assembled buoyancy system 2, a second, elongated connecting element 22' selected from a group comprising chains, ropes, wires and rubber bands, may be threaded in through the recess 5' and the first channel 44' and out through the second channel 45'. Then the connecting element 22' is threaded through a float 24' as shown in FIG. 9B. The next floating element 1' is added to the buoyancy system by the method being repeated.

The floating elements 1 may he put together into an annular buoyancy system 2 as shown in FIGS. 9A and 9B. Such a buoyancy system 2 is suitable for keeping an enclosure 26 for fish afloat. In the embodiment with the keel portion 29 nearer to the side face 12 than to the side face 14, the assembled buoyancy system 2 is advantageous for keeping a closed cage 26 afloat when the side face 12 faces in towards the closed cage 26. The floating element 1 has greater buoyancy on the side facing in towards the cage 26 than the side facing away from the cage 26.

In the transverse channel 6, the floating element 1 may be provided with a resilient member 62. The resilient member 62 may be a helical spring or an elastic band, for example. This is shown schematically by a helical spring 62 in FIG. 3. The resilient member 62 is attached to the first connecting element 22 in the cut-out 4 and to the second connecting element 22' in the cut-out 4' as shown in FIG. 3. The resilient member 62 will tighten the connecting elements 22 and 22' in such a way that the distance between two adjacent floating elements 1, 1' becomes shorter. At the same time, the resilient member 62 will make the assembled buoyancy system 2 move more smoothly in rough sea, even if the connecting element 22, 22' is constituted by an inelastic material such as a wire or a chain. At its end portions 64, the resilient member 62 may be provided with a hook portion 66 which may be slipped onto a chain link in a chain 22 or around a wire 22. In alternative embodiments, the end portion may be provided with a snap hook or a shackle. Other methods of attaching the resilient member 62 to the connecting element 22, 22' will also be known to a person skilled in the art.

Figure 4:
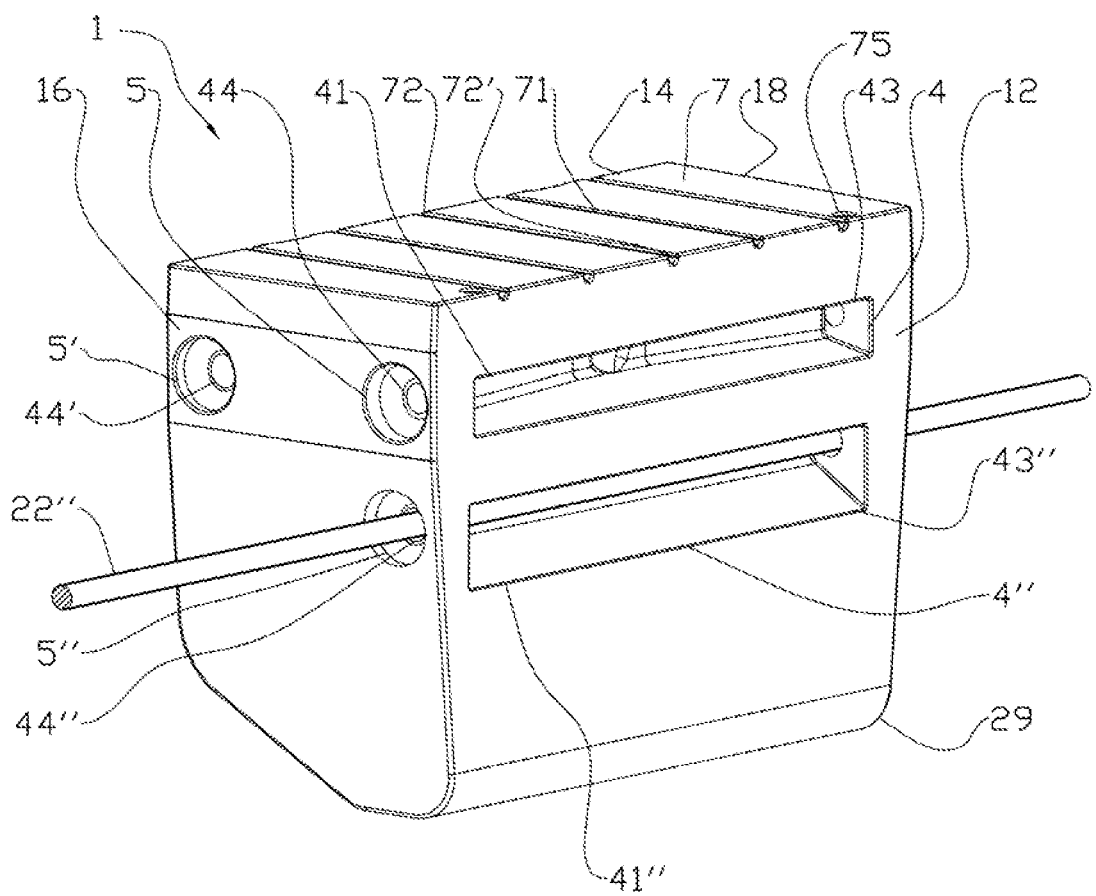
FIG. 4 shows, on the same scale as FIG. 1, a perspective view of a floating element in a third embodiment and with an elongated connecting element.

In the alternative embodiments that are shown in FIGS. 4 and 5, the buoyancy system 2 may be provided with a third connecting element 22" and a fourth connecting element 22''', respectively, selected from a group comprising chains, ropes, wires and rubber bands.

Floating elements 1 may be put together into a buoyancy system 2 for a cage 9 as shown in FIGS. 9A and 9B. The wall 92 of the cage 9 may be attached to one or both of the connecting elements 22, 22" with first attachment members 96, 96" as shown in FIG. 10 If the wall 92 is constituted by a seine in an open cage 9, the first attachment members 96, 96" may be attached to a so-called belly band (not shown) sewn into the seine to prevent tearing. The first attachment members 96, 96" are attached to the connecting element 22, 22". If the connecting element 22, 22" is constituted by a. chain as shown in FIG. 10, the first attachment member 96, 96" may be slipped onto a chain link if the connecting element 22, 22" is constituted by a rope, a line or a wire, the first attachment member 96, 96" may be slidably attached around one or both of the connecting elements 22, 22". The cage 9 is further provided with a jump net 94 to prevent fish from escaping from the cage 9. The jump net 94 is provided with a second attachment member 98. The second attachment member 98 may be attached to the pole 8 or the railing 80. The attachment member 96, 96", 98 may include ropes, hooks, snap hooks with or without screw locks and shackles. Attaching the cage 9 to the buoyancy system 2 as described has the advantage of the floating element 1 taking the load of the wall 92 whereas the pole 8 or the railing 80 only takes the load of the jump net 94. This has further the advantage of the cage 9 being attachable with one set of attachment members 96 to the elongated connecting element 22 and with one second set of attachment members 96" to the elongated connecting element 22". This provides double security in the attachment of the cage 9 to the buoyancy system 2 in case of a break in one of the elongated connecting elements 22, 22".

In FIG. 10, an optional embodiment is shown as well, m which a schematically shown portion of an escape net 99 is attached to the buoyancy system 2 on a side facing away from the schematically shown portion of the cage 9, and so that it surrounds the cage 9. The escape net 99 is constituted by a fishing net. if the cage 9 should burst or a hole or tear arises in some other way in the wall 92, fish that escape from the cage 9 will be caught in the escape net 99. This has the advantage of fish that escape from the cage 9 easily being caught and not being able to swim away and intermingle with wild fish of the same species. The escape net 99 may be attached to the connecting element 22' in, as far as it goes, the same manner as that in which the wall 92 is attached to the connecting element 22. 22'. The escape net 99 may also be attached to an elongated connecting element 22''' which is shown in FIG. 9B, or to both the elongated connecting elements 22', 22'''.

In its top face 7, the floating element 1 may be provided with a hatch (not shown) projecting from the top face 7 of the floating element to the top face 7 of an adjacent floating element 1'. The hatch will cover the gap formed between two floating elements 1, 1', so that personnel present on the buoyancy system 2 are protected from getting pinched between the floating elements 1, 1'.

In an alternative embodiment, not shown, the cut-out 4 is formed as an unbroken cut-out from the coupling face 16 to the coupling face 18. The connecting element 22 may then be laid sideways into the cut-out 4 without having to be threaded through the channel 44, 45. In its top face 7, the floating element 1 is further provided with a bore extending downwards from the corner portion of the top face 7 past the cut-out. A bolt may be lockably positioned in the bore. After the connecting element 22 has been positioned in the cut-out, the bolt is secured in the bore so that the connecting element 22 is held releasably fixed in the cut-out. In an embodiment in which the floating element 1 is provided with two cut-outs 4, 4" side by side from the coupling face 16 to the coupling face 18, the bore and bolt are made long enough for them to span both cut-outs 4, 4". If necessary, the floating element 1 may be provided, in its corner portions, with reinforcements of a kind known per se, for the bolt not to be torn out of the floating element 1 when loaded by the connecting element 22.

The floating element 1 may be constituted by a polymer or a metal. The floating element 1 may advantageously be constituted by a polymer and be produced by rotational casting as it is known within the art. The polymer may be constituted by, for example, polyethylene, polystyrene, ethylene-vinyl acetate or polypropylene.

The internal cavity 3 may be provided with a buoyancy material. The buoyancy material may be constituted by a polymer such as a foamed polymer, like foamed polyurethane for example.

When several floating elements 1 are put together with intermediate floats 24 into a buoyancy system 2, it may be advantageous for the elongated element 22 to be divided into several units. Thereby, the work of threading long stretches of the elongated connecting element 22 through the channels 44, 45 and cut-outs 4 is avoided. If the elongated connecting element 22 is constituted by a chain, the chain may be joined in a known manner with shackles, for example, or with snaphooks with or without screw locks, in the cut-out 4. Elongated connecting elements 22 that are constituted by wires may be joined correspondingly with known joining means. The person skilled in the art will also understand that the elongated connecting element 22 may be made up of portions of different elements such as chains alternating with wires. The person skilled in the art will also understand that it is easily feasible to lengthen an existing buoyancy system 2, which is formed with floating elements 1, by adding further floating elements 1 to the buoyancy system 2. The person skilled in the art will also understand that it is easily feasible to shorten an existing buoyancy system 2 which is formed from floating elements 1, by removing floating elements 1 from the buoyancy system 2.

In the figures, the floating element 1 is shown in embodiments which are particularly suitable for forming buoyancy systems 2 for cages 9. The invention is not restricted to this purpose only. In other embodiments, the side faces 12, 14 may be of equal length, so that the coupling faces 16 and 18 are substantially parallel. Such floating elements are well suited for forming floating piers in a small-craft harbour or marina for mooring smaller vessels like sailboats, pleasure boats and other types of small vessels. Two and two floating elements 1, 1' may be held together sideways by threading a connecting element through the transverse channels 6 from the elongated connecting element 22 in the cut-out 4 of the floating element 1 and to the cut-out 4' in the floating element 1' (not shown). More than two floating elements 1 may be held together in a similar way. The moorings of a vessel may be secured to an elongated body 22 in the cut-outs 4, 4', 4", 4'''. This has the advantage that the walkway of the floating pier may be kept free of mooring rings, bollards and other mooring materials, and that mooring lines do not cross all or parts of the walkway. The person skilled in the art will also understand that some of the cut-outs 4, 4', 4", 4''' may be provided with an elongated element, which extends only from the coupling face 16 to the coupling face 18 of one floating element 1 (not show).

Besides moorings, a ladder, for example, may be attached to an elongated element or to an elongated connecting element 22 in the cut-out 4.

The invention claimed is:

1. A floating element for forming a modularly constructed buoyancy system, the floating element comprising a cavity, wherein at least a first side face of the floating element defines a peripheral surface thereof and is formed with at least one first cut-out which, at a first end thereof, is provided with a first channel whose mouth is in a first coupling face, and which, at a second end, is provided with a second channel whose mouth is in a second coupling face, wherein, in a position of application, the first side face has a portion submerged deeper than the second side face.

2. The floating element in accordance with claim 1, wherein an opposite, second side face of the floating element is provided with at least one second cut-out which, at a first end thereof, is provided with a first channel whose mouth is in the first coupling face, and which, at a second end, is provided with a second channel whose mouth is in the second coupling face.

3. The floating element in accordance with claim 1, wherein the first side face is further provided with a third cut-out which, at a first end, is provided with a first channel whose mouth is in the first coupling face, and which, at a second end, is provided with a second channel whose mouth is in the second coupling face.

4. The floating element in accordance with claim 2, wherein the second side face is further provided with a fourth cut-out which, at a first end, is provided with a first channel whose mouth is in the first coupling face, and which, at a second end, is provided with a second channel whose mouth is in the second coupling face.

5. The floating element in accordance with claim 1, wherein the channels are formed with recesses in the coupling faces.

6. The floating element in accordance with claim 2, comprising a transverse channel extending from the first cut-out to the second cut-out.

7. The floating element in accordance with claim 1, wherein the floating element is provided with two keel portions side by side.

8. The floating element in accordance with claim 1, further comprising a top face provided with a plurality of grooves extending substantially from the first side face to the second side face.

9. The floating element in accordance with claim 8, wherein, in a position of application, the grooves form a downward slope from the first side face to the second side face.

10. The floating element in accordance with claim 1, wherein the cavity of the floating element is filled with a buoyancy material.

11. A floating element for forming a modularly constructed buoyancy system, the floating element comprising a cavity wherein at least a first side face of the floating element is formed with at least one first cut-out which, at a first end, is provided with a first channel whose mouth is in a first coupling face, and which, at a second end, is provided with a second channel whose mouth is in a second coupling face, wherein an opposite, second side face of the floating element is provided with at least one second cut-out which, at a first end, is provided with a first channel whose mouth is in the first coupling face, and which, at a second end, is provided with a second channel whose mouth is in the second coupling face, and wherein, in a position of application, the first side face has a portion submerged deeper than the second side face.

* * * * *